United States Patent
Kuboki et al.

(10) Patent No.: US 10,396,412 B2
(45) Date of Patent: Aug. 27, 2019

(54) POWER STORAGE MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hideyuki Kuboki, Yokkaichi (JP); Hiroki Hirai, Yokkaichi (JP); Makoto Higashikozono, Yokkaichi (JP); Akihisa Hosoe, Osaka (JP); Tomoharu Takeyama, Osaka (JP); Yoshiyuki Hirose, Osaka (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/777,844

(22) PCT Filed: Dec. 1, 2016

(86) PCT No.: PCT/JP2016/085684
§ 371 (c)(1),
(2) Date: May 21, 2018

(87) PCT Pub. No.: WO2017/094821
PCT Pub. Date: Jun. 8, 2017

(65) Prior Publication Data
US 2018/0351221 A1    Dec. 6, 2018

(30) Foreign Application Priority Data

Dec. 2, 2015 (JP) .................. 2015-235680

(51) Int. Cl.
*H01M 10/652* (2014.01)
*H01M 10/6552* (2014.01)
(Continued)

(52) U.S. Cl.
CPC .......... *H01M 10/652* (2015.04); *H01M 2/10* (2013.01); *H01M 10/613* (2015.04);
(Continued)

(58) Field of Classification Search
None
See application file for complete search history.

(56) References Cited

U.S. PATENT DOCUMENTS

2007/0292751 A1    12/2007   Cherng
2010/0252238 A1    10/2010   Batty
(Continued)

FOREIGN PATENT DOCUMENTS

| JP | H0745310 A | 2/1995 |
| JP | H1123169 A | 1/1999 |
| JP | 2013157111 A | 8/2013 |

OTHER PUBLICATIONS

International Preliminary Report on Patentability for Application No. PCT/JP2016/085684 dated Jun. 27, 2017; 8 pages.
(Continued)

*Primary Examiner* — Wojciech Haske
(74) *Attorney, Agent, or Firm* — Reising Ethington, P.C.

(57) ABSTRACT

A power storage module includes power storage elements and cooling members that are in contact with the power storage elements to transfer heat. The cooling member includes an enclosing member, refrigerant, and an absorbing
(Continued)

member absorbing the refrigerant, and the enclosing member includes a first sheet member and a second sheet member that are connected in a liquid tight manner, and the refrigerant and the absorbing member are arranged within the enclosing member. The cooling member is arranged to be inclined with respect to a horizontal plane such that a section thereof being in contact with the power storage element to transfer heat is on a lower level.

3 Claims, 8 Drawing Sheets

(51) Int. Cl.
    *H01M 10/6555* (2014.01)
    *H01M 2/10* (2006.01)
    *H01M 10/647* (2014.01)
    *H01M 10/6569* (2014.01)
    *H01M 10/613* (2014.01)
(52) U.S. Cl.
    CPC ..... *H01M 10/647* (2015.04); *H01M 10/6552* (2015.04); *H01M 10/6555* (2015.04); *H01M 10/6569* (2015.04)

(56) References Cited

U.S. PATENT DOCUMENTS

2010/0291419 A1* 11/2010 Zhou ................ F28D 15/02
                                                    429/50
2015/0037648 A1    2/2015 Nguyen et al.

OTHER PUBLICATIONS

English Translation of International Preliminary Report on Patentability for Application No. PCT/JP2016/085684 dated Jun. 27, 2017; 8 pages.
International Search Report and Written Opinion for Application No. PCT/JP2016/085684 dated Jan. 31, 2017; 12 pages.
English Translation of International Search Report and Written Opinion for Application No. PCT/JP2016/085684 dated Jan. 31, 2017; 8 pages.

* cited by examiner

POWER STORAGE MODULE

CROSS REFERENCE TO RELATED APPLICATIONS

This application claims the priority of Japanese patent application JP2015-235680 filed on Dec. 2, 2015, the entire contents of which are incorporated herein.

TECHNICAL FIELD

The present technology relates to a technology of cooling a power storage module.

BACKGROUND ART

A technology of cooling a power storage module has been known. A heat pipe described in Patent Document 1 has been known. Such a heat pipe includes a pipe made of metal and heat transfer fluid filled in the heat pipe in a fluid tight manner.

[Patent Document 1] Japanese Unexamined Patent Application Publication No. 11-23169

SUMMARY

According to the above structure, the pipe needs to be strong to seal the heat transfer fluid therein because the heat transfer fluid that receives heat from a heating element is evaporated and increases its volume and pressure within the pipe is increased. If the pipe that is relatively strong and encloses the heat transfer fluid therein in a fluid tight manner is used, a manufacturing cost may be increased.

As an assumptive technology for solving the above problem, a following cooling member has been proposed. The cooling member includes an enclosing member including sheet members that are connected to each other in a liquid tight manner, refrigerant enclosed within the enclosing member, and an absorbing member that is in the enclosing member and absorbs the refrigerant.

However, according to the above-described assumptive technology, according to the evaporation of the refrigerant, the pressure within the enclosing member is increased and the sheet members are expanded. Then, liquefied refrigerant may remain inside the expanded sheet members. The refrigerant remaining inside the sheet members do not work for cooling and the cooling properties of the cooling member may be lowered.

The present technology described in this specification has been completed in view of the circumstances described above. It is an object of the present technology to improve cooling properties of a cooling member.

A power storage module according to the description in this specification includes a power storage element, and a cooling member that is in contact with the power storage element to transfer heat, and the cooling member includes an enclosing member, refrigerant, and an absorbing member absorbing the refrigerant. The enclosing member includes sheet members that are connected in a liquid tight manner, and the refrigerant and the absorbing member are arranged within the enclosing member. The cooling member is arranged to be inclined with respect to a horizontal plane such that a section thereof being in contact with the power storage element to transfer heat is on a lower level.

According to the above configuration, heat generated in the power storage element is transferred to to cooling member and further to the refrigerant enclosed in the cooling member and then, the refrigerant is vaporized. In this sequence, heat of vaporization is removed from the power storage element to cool the power storage element.

The cooling member is arranged to be inclined with respect to the horizontal plane such that the section thereof being in contact with the power storage element to transfer heat is on a lower level. With such a configuration, the refrigerant that is made into gas moves upward from the section that is in contact with the power storage element to transfer heat, and the refrigerant that is made into steam is cooled and returns to liquid at an upper section of the cooling member.

The cooling member is arranged to be inclined with respect to the horizontal plane such that the section thereof being in contact with the power storage element to transfer heat is on the lower level. With such a configuration, the refrigerant that is made into liquid flows downward within the enclosing member and moves to the section where the cooling member and the power storage element are contacted to transfer heat. Accordingly, the refrigerant that does not work for cooling is less likely to remain in the cooling member and the cooling properties of the cooling member can be improved.

Following configurations may be preferable for embodiments of the technology described in this specification.

The cooling member and the power storage element may be arranged in a casing, and the casing may be arranged to be inclined with respect to the horizontal plane such that a section where the cooling member and the power storage element are in contact with each other to transfer heat is on a lower level.

According to the above configuration, the cooling properties of the power storage module can be improved.

The cooling member may be inclined with respect to the horizontal plane at an angle of 0.5° or more.

According to the above configuration, the refrigerant that is liquefied inside the cooling member surely flows down within the cooling member and moves to the section where the cooling member and the power storage element are in contact with each other to transfer heat therebetween. Accordingly, the cooling properties of the cooling member can be surely improved.

According to the present technology described in this specification, cooling properties of a cooling member is improved.

MODES FOR CARRYING OUT THE INVENTION

First Embodiment

A first embodiment according to a technology described in this specification will be described with reference to FIGS. 1 to 7. A power storage module 10 according to this embodiment includes a casing 11, power storage elements 12 arranged in the casing 11, and cooling members 13 that are arranged in the casing 11 and in contact with a part of an outer surface of each of the power storage elements 12. In the following description, an X direction represents a right side, a Y direction represents a front side, and a Z direction represents an upper side. Symbols or numerals are put on one or some of the parts having the same shape and no symbols or numerals may be put on the rest of them.

Figure 1:
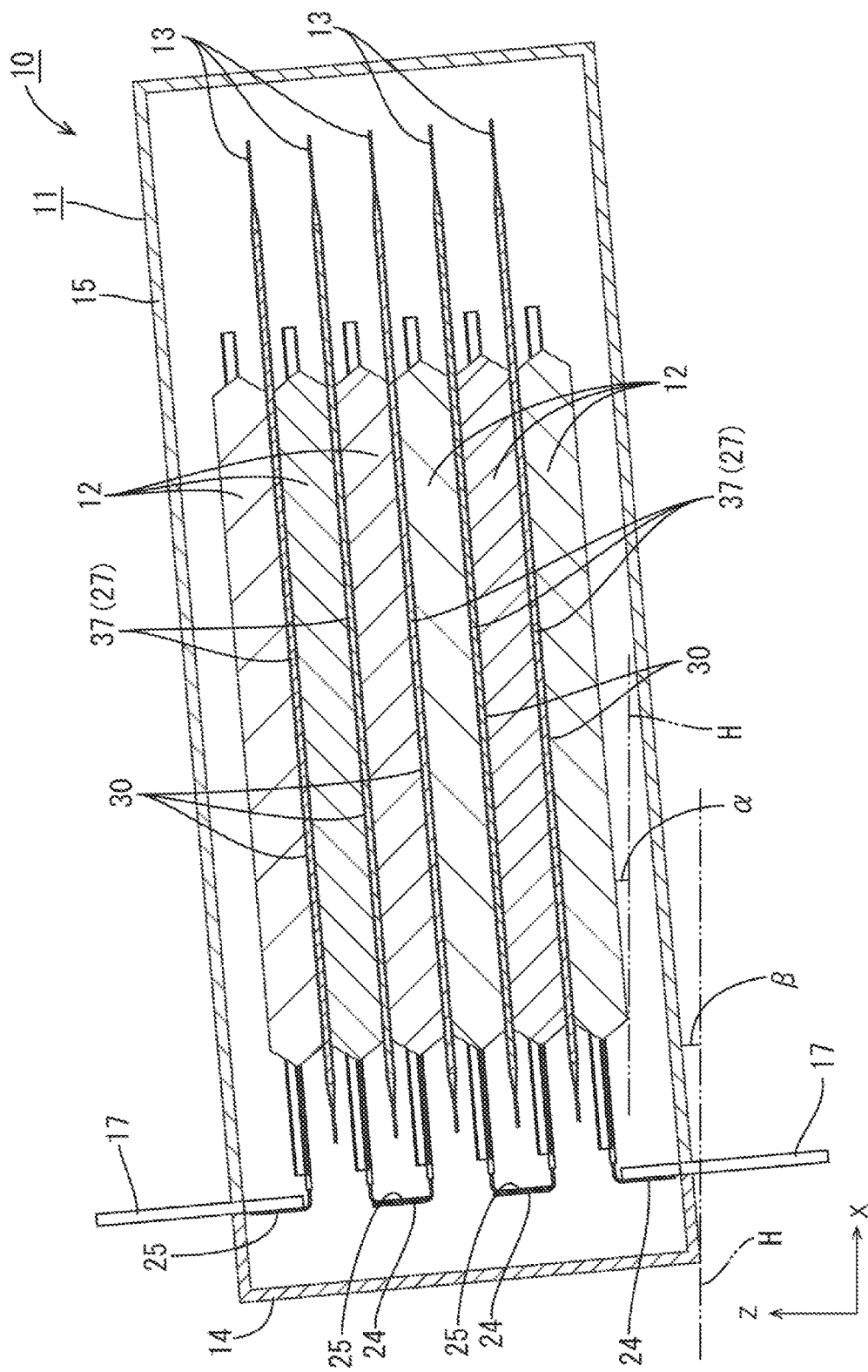
FIG. 1 is a cross-sectional view illustrating a power storage module according to a first embodiment taken along line I-I in FIG. 2.

As illustrated in FIG. 1, the casing 11 is a substantially rectangular parallelpiped shape as a whole. The casing 11 includes a first case 14 and a second case 15. The first case 14 is open toward a right side and has a substantially rectangular shape seen from the right side. The second case 15 is mounted on a right side with respect to the first case 14 and has a substantially rectangular cross-sectional shape and has a box shape opening toward a left side.

The first case 14 and the second case 15 may be made of any material such as synthetic resin or metal. The first case 14 and the second case 15 may be made of different materials or the same material.

The first case 14 and the second case 15 may be connected with a known method such as a locking structure including a locking member and an locked member, a screwing structure, and bonding with adhesive. The first case 14 and the second case 15 that are made of metal may be connected with a known method such as laser welding and brazing. In this embodiment, the first case 14 and the second case 15 are not connected in a liquid tight manner. However, the first case 14 and the second case 15 may be connected in a liquid tight manner.

A pair of power terminals 17 are mounted on a left end side section of the casing 11 and one of them projects upward and the other projects downward. The power terminals 17 are formed from a metal plate.

Figure 2:
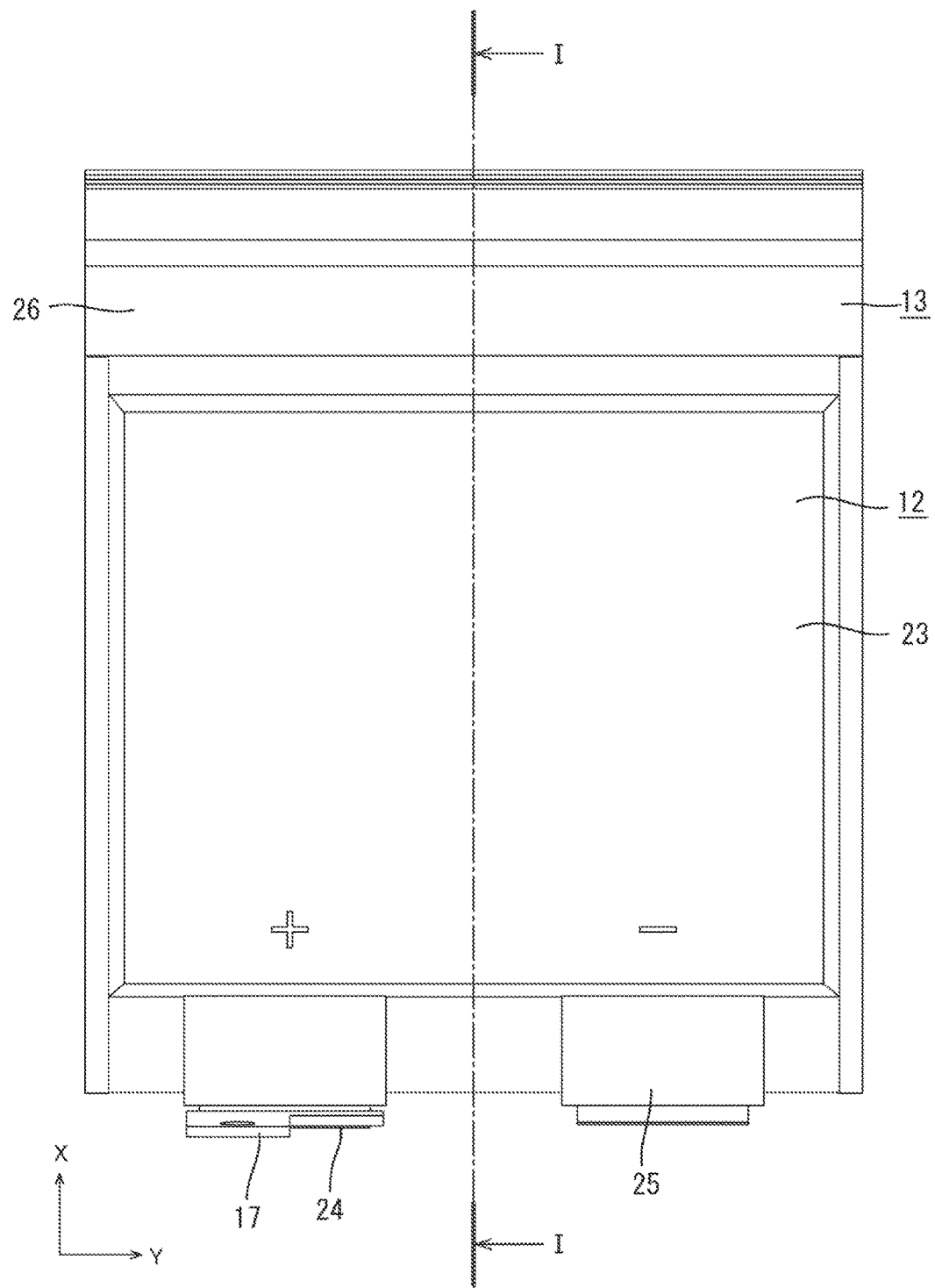
FIG. 2 is a plan view illustrating a power storage element and a cooling member.

The power storage element 12 includes a pair of battery laminating sheets 23 and a power storage component, which is not illustrated, between the laminating sheets 23, and edge sections of the battery laminating sheets 23 are bonded in a liquid tight manner with a known method such as heat-welding. As illustrated in FIG. 2, a positive terminal 24 and a negative terminal 25 that are formed from a thin metal foil extend from an inside to an outside of the battery laminating sheet 23 while being in contact with an inner surface of the battery laminating sheet 23 in a liquid tight manner. The positive terminals 24 and the negative terminals 25 are arranged in a front-rear direction at intervals. The positive terminals 24 and the negative terminals 25 are electrically connected to the power storage components, respectively.

As illustrated in FIG. 1, the power storage elements 12 (six in this embodiment) are arranged in an up-down direction. The power storage elements 12 arranged adjacent in the up-down direction include one positive terminal 24 next to another negative terminal 25 and one negative terminal 25 next to another positive terminal 24. The positive terminal 24 and the negative terminal 25 that are next to each other are bent to be closer to each other and overlapped with each other and the positive terminal 24 and negative terminal 25 that are overlapped in a right-left direction are electrically connected to each other with a known method such as laser welding, ultrasonic welding, and brazing. Thus, the power storage elements 12 are connected in series.

In this embodiment, secondary batteries such as lithium ion secondary batteries and nickel hydride batteries or capacitors such as electric double layer capacitors and lithium ion capacitors may be used as the power storage elements 12, and any power storage elements 12 can be used as appropriate.

The cooling member 13 includes refrigerant 27 and an enclosing member 26 that is formed in a liquid tight manner and the refrigerant 27 is enclosed inside the enclosing member 26. An amount of the refrigerant 27 enclosed in the enclosing member 26 is determined as appropriate. In this embodiment, the refrigerant 27 is absorbed by an absorbing member 37, which will be described later, and the refrigerant 27 is not clearly illustrated in the drawings. One or some may be selected from a group of perfluorocarbon, hydrofluoroether, hydrofluoroketone, fluorine inert liquid, water, and alcohol such as methanol and ethanol and can be used as the refrigerant 27. The refrigerant 27 may have an insulating property or may have conductivity. The cooling member 13 has a length dimension in the right-left direction that is greater than the length dimension of the power storage element 12.

Figure 3:
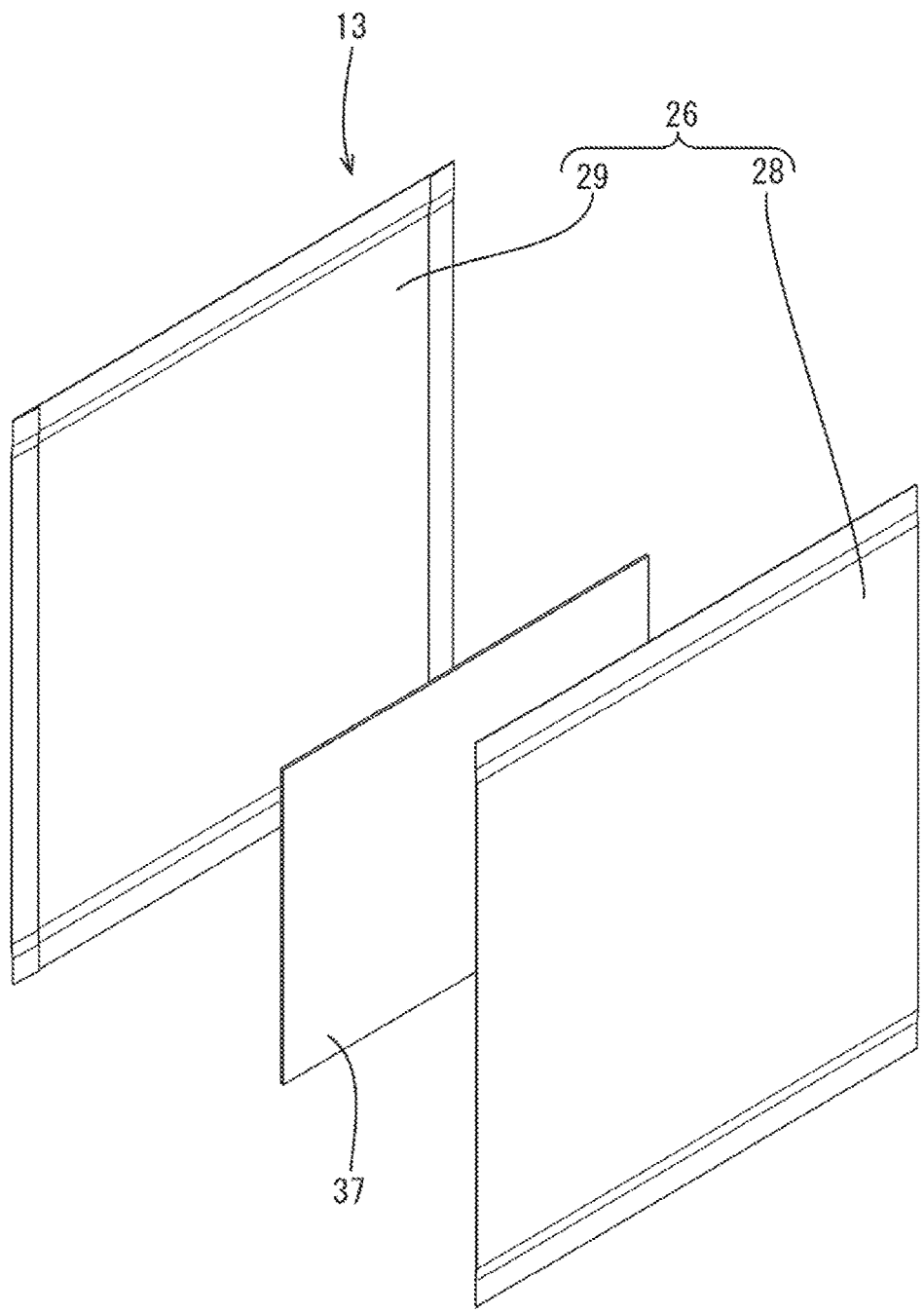
FIG. 3 is an exploded perspective view illustrating the cooling member.

As illustrated in FIG. 3, the enclosing member 26 includes a first sheet member 28 and a second sheet member 29 having a substantially rectangular shape and the two sheet members are connected to each other in a liquid tight manner with a known method such as bonding, deposition, or welding.

Each of the first sheet member 28 and the second sheet member 29 includes a metal sheet and synthetic resin films on both surfaces of the metal sheet. Any metal such as aluminum, aluminum alloy, copper, or copper alloy may be selected as appropriate as the metal of the metal sheet. Any synthetic resin such as polyolefin such as polyethylene and polypropylene, polyester such as polybutylene terephthalate, and polyamide such as nylon 6 and nylon 6, 6 may be selected as appropriate as the synthetic resin of the synthetic resin film.

The enclosing member 26 of this embodiment is obtained by overlapping a surface of the first sheet member 28 having the synthetic resin film and a surface of the second sheet member 29 having a synthetic resin film and bonding the sheet members with heat-welding.

The enclosing member 26 has a contact section 30 on an outer surface thereof and the contact section 30 is in contact with the power storage element 12 to transfer heat therebetween.

The absorbing member 37 is included inside the enclosing member 26. The absorbing member 37 is formed from a substantially rectangular sheet.

The absorbing member 37 is made of material that can absorb the refrigerant 27. The absorbing member 37 may be formed from a cloth or a non-woven cloth of fibers that can absorb the refrigerant 27. Examples of the non-woven cloth may include a fiber sheet, web (a thin film sheet made of only fibers), and batt (fibers of blanket). The material of the absorbing member 37 may be natural fibers or synthetic fibers made of synthetic resin or may include both of the natural fibers and the synthetic fibers.

The absorbing member 37 is preferably prepared as follows. When sixty seconds has elapsed after a lower end portion of the absorbing member 37, which is disposed in a vertical position, is immersed in the refrigerant 27, the refrigerant 27 spreads within the absorbing member 37 such that a distance (a height dimension) between an upper end of the refrigerant 27 and a liquid surface of the refrigerant 27 is preferably 5 mm or more. According to such a configuration, the absorbing properties of the refrigerant 27 is improved and cooling properties of the cooling member 13 can be improved.

The absorbing member 37 that is arranged in the enclosing member 26 has an area same as or larger than an area of the contact section 30. In this embodiment, the absorbing member 37 that is arranged in the enclosing member 26 has an area slightly larger than that of the contact section 30.

The casing 11 is disposed to be inclined with respect to a horizontal plane H such that a right end portion thereof faces upward and a left end portion thereof faces downward. According to such a configuration, the power storage elements 12 and the cooling members 13 are also disposed to be inclined with respect to the horizontal plane H in the casing 11 such that right end portions thereof face upward and left end portions thereof face downward. In other words, the outer surfaces of each enclosing member 26 of the cooling member 13 are inclined with respect to the horizontal plane H.

The contact section 30 where the power storage element 12 and the cooling member 13 are in contact to transfer heat therebetween is on a relatively lower section of the cooling member 13.

An angle α between a lower surface of the cooling member 13 and the horizontal plane H is greater than 0°. The angle α is preferably 0.5° or more because the cooling properties of the cooling member 13 can be surely improved. If the angle α is 0.5° or more, the refrigerant 27 that is liquefied inside the cooling member 13 surely flows down within the cooling member 13 and moves to the section where the cooling member 13 and the power storage element 12 are in contact with each other to transfer heat therebetween.

An angle θ between a lower wall of the casing 11 and the horizontal plane H is greater than 0°. The angle θ is preferably 0.5° or more because the cooling properties of the cooling member 13 can be surely improved. If the angle θ is 0.5° or more, the refrigerant 27 that is liquefied inside the cooling member 13 surely flows down within the cooling member 13 and moves to the section where the cooling member 13 and the power storage element 12 are in contact with each other to transfer heat therebetween.

The angle α between the lower surface of the cooling member 13 and the horizontal plane H and the angle θ between the lower wall of the casing 11 and the horizontal plane H may be the same or different.

Operations and Effects of Embodiment

Figure 8:
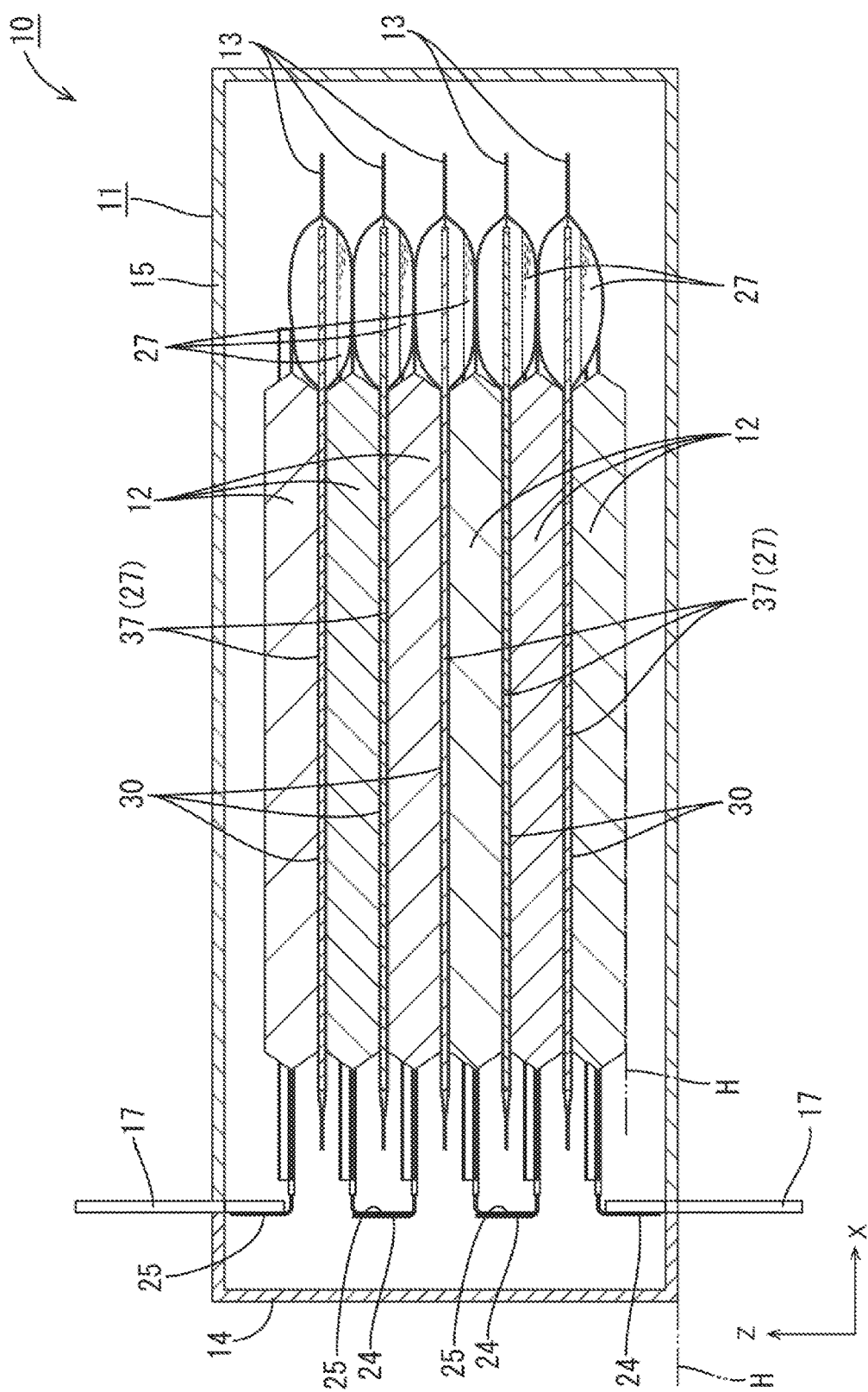
FIG. 8 is a cross-sectional view illustrating a power storage module according to an assumptive technology.

Before describing operations and effects of this embodiment, problems in the assumptive technology will be described with reference to FIG. 8. Symbols or numerals on the parts in FIG. 8 are same as those on the parts of the embodiment as long as it is not especially mentioned. The following problems may be caused if the casing 11 of the power storage module 10 is horizontally arranged as illustrated in FIG. 8.

Heat generated in the power storage element 12 is transferred to the cooling member 13 and transferred to the refrigerant 27 enclosed within the cooling member 13 and then, the refrigerant 27 is evaporated and made into gas. This increases the pressure inside the enclosing member 26. Then, the first sheet member 28 and the second sheet member 29 are deformed to increase the volume of the enclosing member 26. Especially, in the section of the cooling member 13 that is not sandwiched by the power storage elements 12, the enclosing member 26 expands.

The evaporized refrigerant 27 is liquefied in the section where the enclosing member 26 expands and flows downward. Then, the liquefied refrigerant 27 remains in a lower portion of the expansion section of the enclosing member 26. The refrigerant 27 cannot return to the contact section 30 where the power storage element 12 and the cooling member 13 are contacted to transfer heat therebetween. Therefore, the remaining refrigerant 27 cannot work for cooling the power storage element 12. If such refrigerant 27 remains in each of the cooling members 13, the cooling efficiency of the cooling member 13 may be lowered.

To solve the above problems, the power storage module 10 according to the technology described in this specification includes a following configuration. The power storage module 10 includes the power storage elements 12, and the cooling members 13 that are in contact with the power storage elements 12 to transfer heat therebetween. The cooling member 13 includes the enclosing member 26 including the first sheet member 28 and the second sheet member 29 that are connected in a liquid tight manner, the refrigerant 27, and the absorbing member 37 absorbing the refrigerant 27. The refrigerant 27 and the absorbing member 37 are arranged inside the enclosing member 26. The cooling member 13 is disposed to be inclined with respect to the horizontal plane H such that the section of the cooling member 13 that is in contact with the power storage element 12 to transfer heat is on a lower level.

According to such a configuration, heat generated in the power storage element 12 is transferred to the cooling member 13 and further to the refrigerant 27 enclosed in the cooling member 13 and then, the refrigerant 27 is vaporized. In this sequence, heat of vaporization is removed from the power storage element 12 to cool the power storage element 12.

Figure 4:
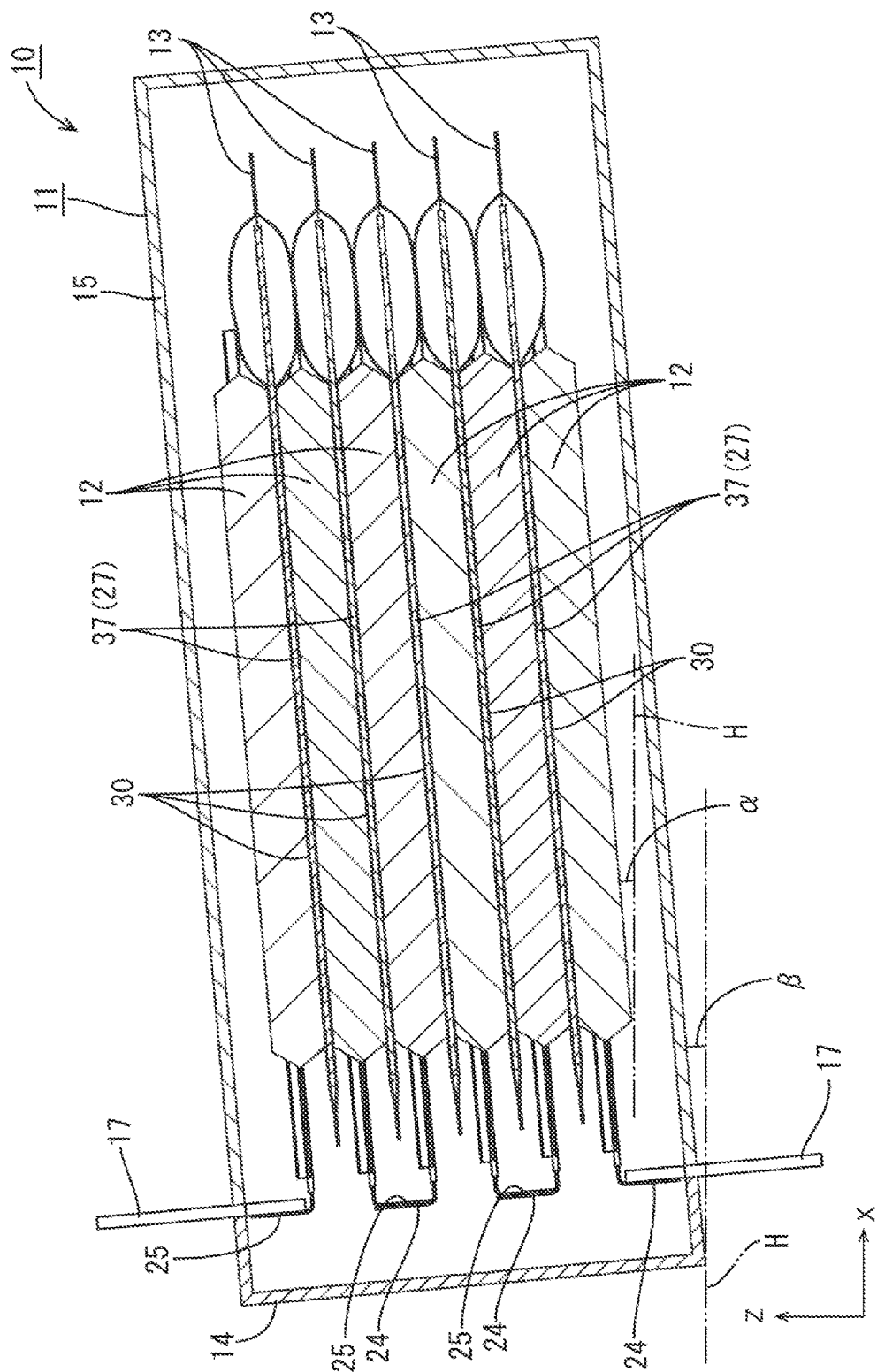
FIG. 4 is a cross-sectional view illustrating the power storage module including an enclosing member that is expanded.

As illustrated in FIG. 4, the cooling member 13 is arranged to be inclined with respect to the horizontal plane H such that the section thereof being in contact with the power storage element 12 to transfer heat is on a lower level. With such a configuration, the refrigerant 27 that is made into gas moves upward from the section that is in contact with the power storage element 12 to transfer heat and the refrigerant 27 that is made into steam is cooled and returns to liquid at an upper section of the cooling member 13.

The cooling member 13 is arranged to be inclined with respect to the horizontal plane H such that the section thereof being in contact with the power storage element 12 to transfer heat is on the lower level. With such a configuration, the refrigerant 27 that is made into liquid flows downward within the enclosing member 26 and moves to the section where the cooling member 13 and the power storage element 12 are contacted to transfer heat. Accordingly, the refrigerant 27 that does not work for cooling is less likely to remain in the cooling member 13 and the cooling properties of the cooling member 13 can be improved.

According to this embodiment, the cooling members 13 and the power storage elements 12 are arranged in the casing 11. The casing 11 is arranged to be inclined with respect to the horizontal plane H such that the section of the cooling member 13 and the power storage element 12 that are contacted to transfer heat is on a lower level. According to such a configuration, the cooling properties of the power storage module 10 is improved.

According to this embodiment, the cooling member 13 is inclined with respect to the horizontal plane H at an angle of 0.5° or more.

According to such a configuration, the refrigerant that is liquefied inside the cooling member 13 surely flows down within the cooling member 13 and moves to the section where the cooling member 13 and the power storage element 12 are in contact with each other to transfer heat therebetween. Accordingly, the cooling properties of the cooling member 13 can be surely improved.

Examples

Figure 5:
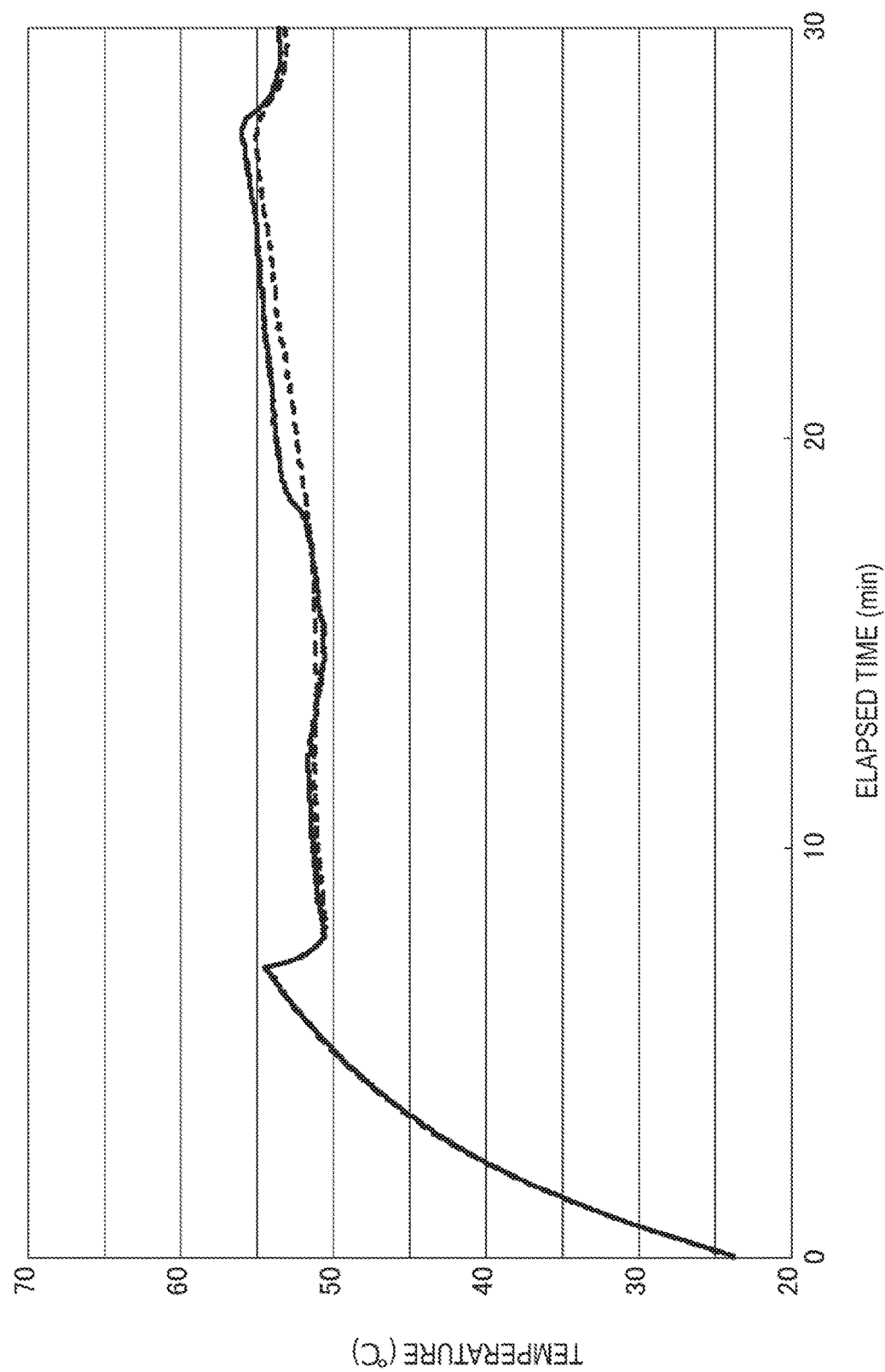
FIG. 5 is a graph representing relation of temperature and elapsed heating time according to Example 1.
Figure 6:
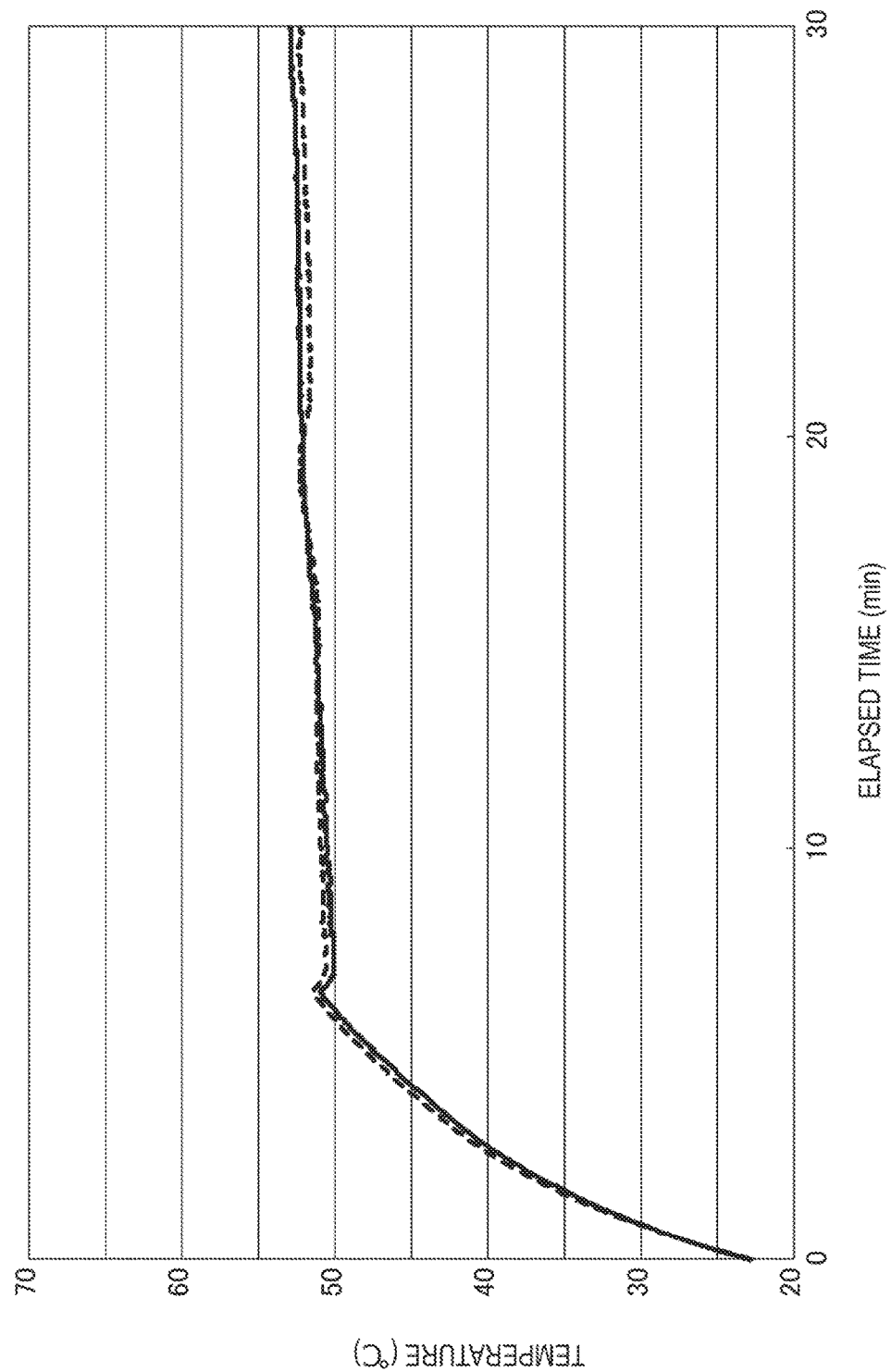
FIG. 6 is a graph representing relation of temperature and elapsed heating time according to Example 2.
Figure 7:
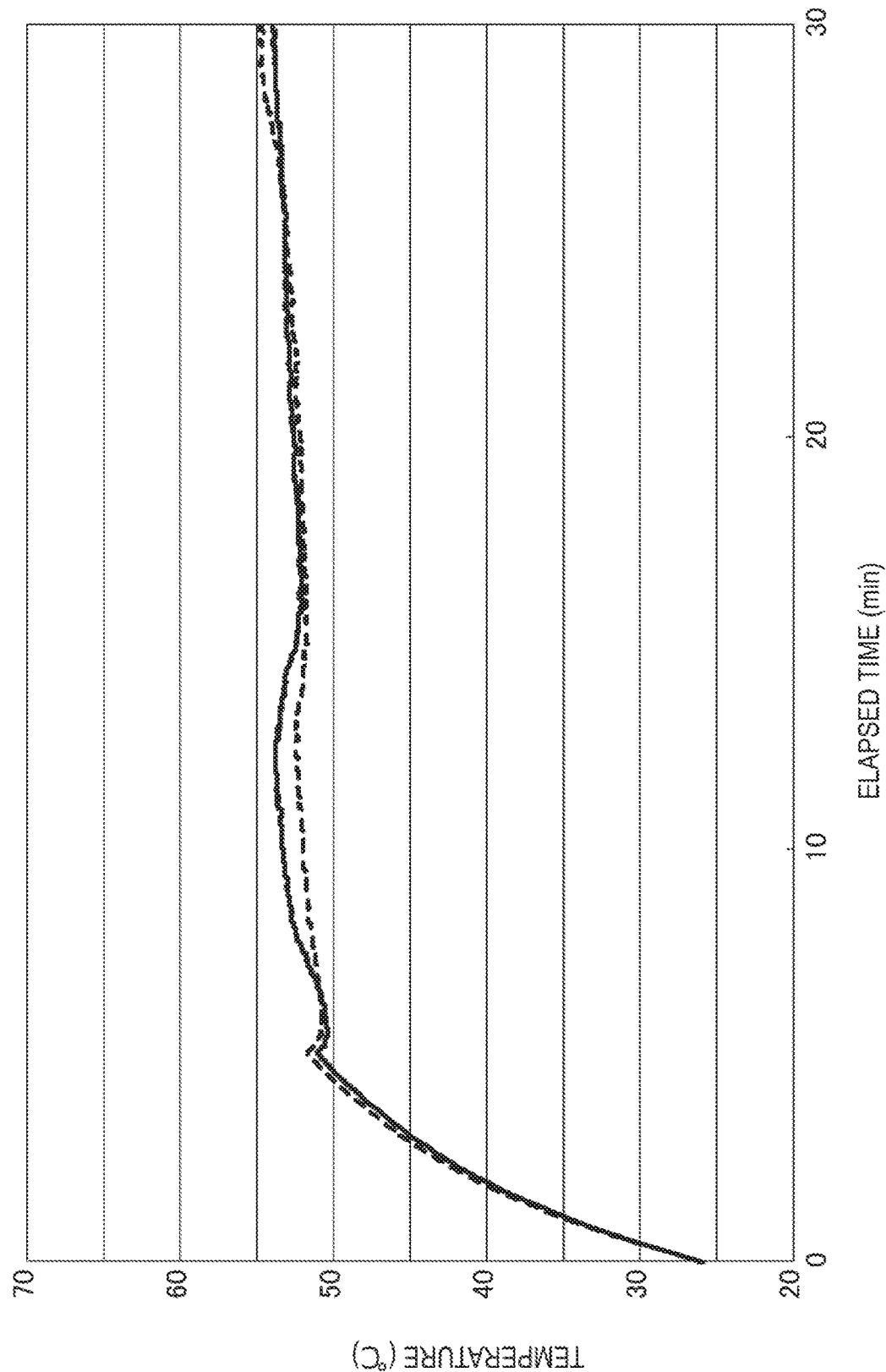
FIG. 7 is a graph representing relation of temperature and elapsed heating time according to Example 3.

Next, Examples 1 to 3 representing effects of the technology described in this specification will be described with reference to FIGS. 5 to 7. A cooling member used in each of Examples 1 to 3 was made as follows. A sheet member of polyethylene was cut into pieces of 120 mm×170 mm. Two sheet members were overlapped while having 10 ml of refrigerant and a non-woven cloth cut into a piece of 118 mm×150 mm therebetween. Then, the edges of the two sheet members are joined with welding to be sealed in a liquid tight manner. The refrigerant is Novec 649 (registered trademark) made by 3M Japan (hereinafter, referred to as refrigerant).

An electric heater of 10 cm×10 cm was pressed on one surface of the cooling member. The heater was pressed against the cooling member with pressure of 0.2 Pa. The heater was supplied with heat quantity of 12 W. The temperature sensor was arranged between the heater and the cooling member. The measured temperature represents temperature of a surface of the heater in a section between the heater and the cooling member. The temperatures have been measured for thirty minutes after start of heating the heater.

In Example 1, the cooling member was horizontally arranged. Namely, the angle α between the cooling member and the horizontal plane is 0°. FIG. 5 illustrates a graph representing temperature change of the heater according to heating time. A solid line represents temperatures of the heater arranged on a lower surface of the cooling member and a dotted line represents temperatures of the heater arranged on an upper surface of the cooling member. The temperature of the heater increased simply for about seven minutes after the start of heating. After overshoot of the heater temperature occurred, the temperature of the heater was dropped once. Then, the heater temperature again increased gently after about eight minutes has elapsed after the start of heating. The heater temperature was over 55° after about twenty seven minutes has elapsed after the start of heating.

In Example 2, the cooling member was arranged to be inclined such that an angle α between the cooling member and the horizontal plane is 0.5°. FIG. 6 illustrates a graph representing temperature change of the heater according to heating time. The temperature of the heater increased simply for about seven minutes after the start of heating. After overshoot of the heater temperature occurred, the temperature of the heater was slightly dropped. Then, the heater temperature again increased gently and was still about 53° after thirty minutes has elapsed after the start of heating.

In Example 3, the cooling member was arranged to be inclined such that an angle α between the cooling member and the horizontal plane is 1.5°. FIG. 7 illustrates a graph representing temperature change of the heater according to heating time. The temperature of the heater increases simply for about five minutes after the start of heating. After overshoot of the heater temperature occurred, the temperature of the heater was slightly dropped. Then, the heater temperature again increased gently and was still about 54° after thirty minutes has elapsed after the start of heating.

In Example 1 where the angle α between the cooling member and the horizontal plane is 0°, the heater temperature was over 55° when thirty minutes has elapsed after the start of heating. In Examples 2 and 3, where an angle θ between the cooling member and the horizontal plane is larger than 0°, the heater temperature was lower than 55° when thirty minutes has elapsed after the start of heating.

Thus, the refrigerant that does not work for cooling a heat generator is less likely to be generated by arranging the cooling member to be inclined with respect to the horizontal plane. Therefore, the cooling properties of the cooling member can be improved.

Other Embodiments

The present technology described in this specification is not limited to the embodiments, which have been described using the foregoing descriptions and the drawings. For example, embodiments described below are also included in the technical scope of the present technology described in this specification.

In the first embodiment, the first sheet member 28 and the second sheet member 29 of the cooling member 13 are laminating films each including a metal sheet and synthetic resin layered on both surfaces of the metal sheet. However, the first sheet member 28 and the second sheet member 29 may not be limited thereto. Each of the first sheet member and the second sheet member may be configured such that synthetic resin is layered on one surface of the metal sheet. Each of the first sheet member and the second sheet member may be formed from a metal sheet. The first sheet member and the second sheet member that are formed from metal sheets can be joined in a liquid tight manner with bonding, welding, and brazing. The first sheet member and the second sheet member may be formed from synthetic resin sheets. Any synthetic resin such as polyolefin such as polyethylene and polypropylene, polyester such as polybutylene terephthalate, and polyamide such as nylon 6 and nylon 6, 6 may be selected as appropriate as the synthetic resin of the synthetic resin film.

In the above embodiment, one absorbing member 37 is arranged in the enclosing member 26. However, it is not limited thereto and two or more absorbing members 37 may be arranged in the enclosing member 26.

In the above embodiment, the enclosing member 26 is formed by connecting the first sheet member 28 and the second sheet member 29. However, it is not limited thereto and the enclosing member 26 may be formed from one sheet member. The sheet member may be folded and edges thereof may be connected in a liquid tight manner to form the enclosing member 26. Three or more sheet members may be connected in a liquid tight manner to form the enclosing member 26.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

EXPLANATION OF SYMBOLS

10: power storage module
11: casing
12: power storage element
13: cooling member
26: enclosing member
27: refrigerant
28: first sheet member
29: second sheet member
37: absorbing member
H: horizontal plane
α: angle between the cooling member and a horizontal plane
β: angle between the casing and the horizontal plane

The invention claimed is:

1. A power storage module comprising:
a power storage element; and
a cooling member that is sandwiched by the power storage elements and in contact with the power storage elements to transfer heat, the cooling member including an enclosing member, refrigerant, and an absorbing member absorbing the refrigerant, the enclosing member including sheet members that are connected in a liquid tight manner, and the refrigerant and the absorbing member being arranged within the enclosing member, wherein
the cooling member has a section that is not sandwiched by the power storage elements and the enclosing member expands in the section according to transfer of heat generated in the power storage elements to the cooling member,
the cooling member is arranged to be inclined with respect to a horizontal plane such that a section thereof being in contact with the power storage element to transfer heat is on a lower level than the section of the cooling member having an expanded enclosing member.

2. The power storage module according to claim 1, wherein
the cooling member and the power storage element are arranged in a casing, and
the casing is arranged to be inclined with respect to the horizontal plane such that a section where the cooling member and the power storage element are in contact with each other to transfer heat is on a lower level.

3. The power storage module according to claim 1, wherein the cooling member is inclined with respect to the horizontal plane at an angle of 0.5° or more.

* * * * *